US010421186B2

(12) United States Patent
Ma et al.

(10) Patent No.: US 10,421,186 B2
(45) Date of Patent: Sep. 24, 2019

(54) METHOD AND APPARATUS FOR WORKING-PLACE BACKFLOW OF ROBOTS

(71) Applicant: Hangzhou Yameilijia Technology Co., Ltd., Hangzhou (CN)

(72) Inventors: Ming Ma, Hangzhou (CN); Jianqiang Zhu, Hangzhou (CN)

(73) Assignee: Hangzhou Yameilijia Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/326,625

(22) PCT Filed: Aug. 3, 2016

(86) PCT No.: PCT/CN2016/093123
§ 371 (c)(1),
(2) Date: Jan. 16, 2017

(87) PCT Pub. No.: WO2017/118001
PCT Pub. Date: Jul. 13, 2017

(65) Prior Publication Data
US 2018/0333847 A1    Nov. 22, 2018

(30) Foreign Application Priority Data

Jan. 4, 2016  (CN) .......................... 2016 1 0003129
Jan. 4, 2016  (CN) .......................... 2016 1 0005062

(51) Int. Cl.
*B25J 9/00* (2006.01)
*B25J 9/16* (2006.01)
*G05D 1/02* (2006.01)

(52) U.S. Cl.
CPC .......... *B25J 9/1664* (2013.01); *B25J 9/0084* (2013.01); *B25J 9/163* (2013.01); *G05D 1/02* (2013.01);
(Continued)

(58) Field of Classification Search
USPC ................................................. 700/245–264
See application file for complete search history.

(56) References Cited

U.S. PATENT DOCUMENTS 5,198,800 A * 3/1993 Tozawa ................. E02F 9/2033
                                                      212/276
5,570,992 A * 11/1996 Lemelson ............. B23Q 11/10
                                                      414/744.3

(Continued)

*Primary Examiner* — Jonathan L Sample
(74) *Attorney, Agent, or Firm* — Schwegman Lundberg & Woessner, P.A.

(57) ABSTRACT

Method and apparatus for working-place backflow of robots, comprising: acquiring current coordinates of robots currently in an idle state in a working place; acquiring all destination coordinates where the robots are going to return; calculating, according to distances and time from the current coordinates to all destination coordinates, target destination coordinates nearest to the current coordinates; controlling the robots to move out of the working place according to backflow paths corresponding to the target destination coordinates, ensuring order departure of the robots; performing, when paths intersect, queuing management on the robots, to determine a crowding point zone; setting, according to pass requests sent by robots in the crowding point zone, scheduling commands respectively for the robots in the crowding point zone; and sending the commands respectively to the robots in the crowding point zone, to make the robots having received the commands pass through the crowding point zone based thereon.

18 Claims, 7 Drawing Sheets

(52) U.S. Cl.
CPC ......... *G05D 1/0217* (2013.01); *G05D 1/0291* (2013.01); *G05B 2219/40417* (2013.01); *G05B 2219/45083* (2013.01); *G05D 2201/0216* (2013.01)

(56) References Cited

U.S. PATENT DOCUMENTS

| | | | | |
|---|---|---|---|---|
| 5,939,986 | A * | 8/1999 | Schiffbauer | B66C 15/045 299/12 |
| 6,061,617 | A * | 5/2000 | Berger | A01B 63/10 700/18 |
| 6,442,450 | B1 * | 8/2002 | Inoue | B25J 13/00 318/565 |
| 6,687,571 | B1 * | 2/2004 | Byrne | G05D 1/0289 700/225 |
| 6,708,385 | B1 * | 3/2004 | Lemelson | B23Q 7/03 29/563 |
| 6,784,800 | B2 * | 8/2004 | Orzechowski | B66F 9/0755 340/539.1 |
| 6,845,311 | B1 * | 1/2005 | Stratton | E02F 3/847 340/870.16 |
| 6,963,278 | B2 * | 11/2005 | Frame | B66C 15/045 340/539.22 |
| 7,062,381 | B1 * | 6/2006 | Rekow | G01S 13/874 342/126 |
| 7,079,931 | B2 * | 7/2006 | Sahm | E02F 3/431 37/414 |
| 7,120,519 | B2 * | 10/2006 | Okabayashi | G05D 1/0038 700/254 |
| 7,310,439 | B2 * | 12/2007 | Silverstein | B25J 9/1697 382/153 |
| 7,353,089 | B1 * | 4/2008 | McEvoy | G05D 1/028 701/2 |
| 7,400,959 | B2 * | 7/2008 | Price | G06F 3/04847 701/36 |
| 7,613,544 | B2 * | 11/2009 | Park | G05D 1/0234 700/245 |
| 7,683,782 | B2 * | 3/2010 | Christopher | G07C 9/00111 340/572.1 |
| 7,728,729 | B2 * | 6/2010 | Christopher | G06Q 10/08 340/572.1 |
| 7,863,848 | B2 * | 1/2011 | Sjoberg | B25J 13/06 318/563 |
| 7,890,235 | B2 * | 2/2011 | Self | G01S 3/143 340/539.1 |
| 8,115,650 | B2 * | 2/2012 | Dasilva | G08B 25/016 340/539.1 |
| 8,174,358 | B2 * | 5/2012 | Butzine | A61B 6/544 340/8.1 |
| 8,195,344 | B2 * | 6/2012 | Song | G08C 17/00 701/2 |
| 8,514,081 | B2 * | 8/2013 | Cristache | G01S 13/876 340/572.1 |
| 8,958,910 | B2 * | 2/2015 | Ichinose | B66B 1/2458 700/257 |
| 8,970,363 | B2 * | 3/2015 | Kraimer | B60R 21/0132 340/539.1 |
| 8,972,045 | B1 * | 3/2015 | Mountz | G06Q 10/087 700/216 |
| 9,041,561 | B2 * | 5/2015 | Wallace | G06Q 10/06 340/992 |
| 9,122,276 | B2 * | 9/2015 | Kraimer | G05D 1/0016 |
| 9,126,334 | B2 * | 9/2015 | Nakamura | B25J 9/1676 |
| 9,446,512 | B1 * | 9/2016 | Moses | B25J 9/0084 |
| 9,665,095 | B1 * | 5/2017 | Romano | G05D 1/0246 |
| 9,733,646 | B1 * | 8/2017 | Nusser | B65G 1/137 |
| 10,120,390 | B2 * | 11/2018 | Gariepy | G05D 1/0297 |
| 10,195,740 | B2 * | 2/2019 | Anderson-Sprecher | G05D 1/0297 |
| 2004/0221790 | A1 * | 11/2004 | Sinclair | G01C 22/02 116/62.1 |
| 2004/0249510 | A1 * | 12/2004 | Hanson | G06N 3/008 700/245 |
| 2005/0107934 | A1 * | 5/2005 | Gudat | G01S 5/0072 701/50 |
| 2005/0222711 | A1 * | 10/2005 | Yoshimi | B25J 9/0003 700/245 |
| 2007/0112461 | A1 * | 5/2007 | Zini | G05B 19/41895 700/245 |
| 2007/0192910 | A1 * | 8/2007 | Vu | B25J 5/007 700/245 |
| 2008/0009967 | A1 * | 1/2008 | Bruemmer | G05D 1/0088 700/245 |
| 2008/0086236 | A1 * | 4/2008 | Saito | G01S 5/0252 700/245 |
| 2008/0294338 | A1 * | 11/2008 | Doh | G05D 1/0234 701/533 |
| 2009/0033269 | A1 * | 2/2009 | Griessnig | H04Q 9/00 318/563 |
| 2009/0141938 | A1 * | 6/2009 | Lim | G06K 9/00664 382/103 |
| 2009/0157228 | A1 * | 6/2009 | Hong | B25J 9/1689 700/259 |
| 2010/0076600 | A1 * | 3/2010 | Cross | H04W 4/70 700/259 |
| 2010/0094463 | A1 * | 4/2010 | Okabayashi | B25J 5/00 700/264 |
| 2010/0222925 | A1 * | 9/2010 | Anezaki | G05D 1/0221 700/253 |
| 2011/0010024 | A1 * | 1/2011 | Salisbury | G06F 3/014 701/2 |
| 2011/0153137 | A1 * | 6/2011 | Yeom | G05D 1/0274 701/25 |
| 2011/0213497 | A1 * | 9/2011 | Nair | B25J 9/1666 700/255 |
| 2011/0227748 | A1 * | 9/2011 | Schaible | F16P 3/14 340/686.6 |
| 2012/0121161 | A1 * | 5/2012 | Eade | G09B 29/007 382/153 |
| 2012/0182392 | A1 * | 7/2012 | Kearns | B25J 11/009 348/46 |
| 2012/0197439 | A1 * | 8/2012 | Wang | B25J 9/1689 700/259 |
| 2012/0197464 | A1 * | 8/2012 | Wang | B25J 9/1689 701/2 |
| 2012/0265391 | A1 * | 10/2012 | Letsky | A01D 34/008 701/25 |
| 2012/0326837 | A1 * | 12/2012 | Ajay | A61F 9/029 340/5.2 |
| 2013/0108992 | A1 * | 5/2013 | Buelthoff | G09B 9/02 434/33 |
| 2013/0231779 | A1 * | 9/2013 | Purkayastha | B25J 9/1697 700/259 |
| 2013/0317642 | A1 * | 11/2013 | Asaria | G06Q 10/08 700/216 |
| 2013/0325244 | A1 * | 12/2013 | Wang | G05D 1/028 701/26 |
| 2014/0135984 | A1 * | 5/2014 | Hirata | B25J 9/1676 700/255 |
| 2014/0160250 | A1 * | 6/2014 | Pomerantz | H04N 5/23229 348/47 |
| 2014/0207282 | A1 * | 7/2014 | Angle | G06F 15/16 700/257 |
| 2014/0277691 | A1 * | 9/2014 | Jacobus | G06Q 10/087 700/216 |
| 2014/0326580 | A1 * | 11/2014 | Carpenter | B65G 21/14 198/571 |
| 2014/0365258 | A1 * | 12/2014 | Vestal | G06Q 10/06311 705/7.15 |
| 2015/0088310 | A1 * | 3/2015 | Pinter | G06Q 50/22 700/253 |
| 2015/0158182 | A1 * | 6/2015 | Farlow | B25J 11/009 700/259 |
| 2015/0332463 | A1 * | 11/2015 | Galera | G06K 9/00771 382/103 |
| 2016/0057925 | A1 * | 3/2016 | Letsky | A01D 34/008 701/23 |
| 2016/0129593 | A1 * | 5/2016 | Wolowelsky | B25J 5/00 700/253 |

(56) References Cited

U.S. PATENT DOCUMENTS

| | | | |
|---|---|---|---|
| 2016/0165795 A1* | 6/2016 | Balutis | G05D 1/0265 |
| | | | 701/25 |
| 2016/0184987 A1* | 6/2016 | Masui | B25J 9/1664 |
| | | | 700/245 |
| 2016/0271800 A1* | 9/2016 | Stubbs | B25J 9/1666 |
| 2016/0274586 A1* | 9/2016 | Stubbs | G06K 7/10366 |
| 2017/0028549 A1* | 2/2017 | Battisti | B25J 9/161 |

* cited by examiner

METHOD AND APPARATUS FOR WORKING-PLACE BACKFLOW OF ROBOTS

This application is a U.S. National Stage Filing under 35 U.S.C. 371 from International Application No. PCT/CN2016/093123, filed on Aug. 3, 2016, which claims the benefit of priority to China. Patent Application No. 201610003129.7, filed on Jan. 4, 2016, and which claims the benefit of priority to China Patent Application No. 201610005062.0, filed on Jan. 4, 2016, each of which is hereby incorporated by reference herein in its entirety.

TECHNICAL FIELD

The present invention relates to the communication field, and particularly to a method and an apparatus for working-place backflow of robots.

BACKGROUND ART

With the development of social economy, the scales and quantities of large-scale places for logistics and people, such as supermarkets, airports, stations, exhibition centers, logistics warehouses and so on, continuously increase, which makes the past people-oriented model fail to satisfy people's demands. Under such a circumstance, a robot capable of working autonomously comes into being. This robot is a multi-functional integrated system with environmental awareness, path planning, dynamic decision making, behavior control and alarm module being integrated, and can realize regular, mobile and self-help work.

Specifically, in the logistics field, the robot can serve as a transport device, which is provided therein with a walking device and a carrying device. Goods in a storage area at a fixed position are carried by the carrying device, and then the carried goods is transported by the walking device to a specified goods arrangement area. When the carried goods is delivered or unloaded by the carrying device in the current goods arrangement area, in order to ensure that the robot can normally and orderly work cyclically, each robot needs to return to a specified storage area according to a specified path, to further repeat the work of picking up the goods—transporting the goods—unloading the goods—returning to pick up the goods.

In the above, in the situation that there is only one storage area and one goods arrangement area mentioned above, the path of each robot is singular, it is relatively easy to control the movement path of the robot in this case, but when there are relatively a lot of the above-mentioned storage areas and goods arrangement areas, there also will be relatively a lot of corresponding robot paths, at this time, when a cluster of robots of a large quantity and a high density carry out large-scale dynamic activities above, each robot, after delivering or carrying the goods, needs to depart orderly as soon as possible more, while the robots going to depart might affect other robots being working in the place, besides, when the cluster of robots have one necessary point to pass through on the backflow paths in the place, if this point should be passed through within a short period of time, crowding may easily occur, resulting in reduction of the overall working efficiency, therefore, an optimized departure scheduling plan is needed so as to improve the working efficiency.

The inventors found in researches that no effective solution has been put forward at present for the problem of ordered departure and improvement of the working efficiency of the cluster of robots of a large quantity and a high density when carrying out the large-scale dynamic activities above in a place. Besides, in the process of the cluster of robots carrying out the large-scale dynamic activities in the place, if the cluster of robots has one necessary point to pass through in the place, when this point should be passed through within a short period of time, it is easy to result in crowding, further causing reduction of the overall working efficiency.

DISCLOSURE OF THE INVENTION

An object of the present invention is to provide a method and an apparatus for working-place backflow of robots, so as to ensure that the robot orderly leaves a working area place as soon as possible after delivering goods, effectively reduce the quantity of idle robots in the place, and meanwhile also reduce the possibility of intersection of paths of the robots; moreover, when intersection of paths of the robots occurs, it avoids occurrence of crowding of the robots in a crowding point zone, increases the speeds of the robots passing through the crowding point, and improves the working efficiency of the robots in the place and the overall working efficiency of the robot cluster.

In a first aspect, an example of the present invention provides a method for working-place backflow of robots, comprising:

acquiring current coordinates of a robot currently in an idle state in a working area;

acquiring coordinates of all destinations which the robot currently in an idle state is going to return to, wherein the coordinates of the destinations are plural, with the plural coordinates of destinations all located outside of the working area; a plurality of storage areas are located outside of the working area, with plurality of storage areas at different zones, and the plurality of coordinates of destinations are all set in the storage areas at predetermined zones outside the working area;

calculating, according to distances from the current coordinates of the robot currently in an idle state to the coordinates of all the destinations and time for the robot moving from a current location to all the destinations, coordinates of a target destination nearest to the current coordinates; and controlling the robot currently in an idle state to move out of the working area according to a backflow path corresponding to the coordinates of the target destination, so as to ensure that the robot currently in an idle state departs orderly.

In conjunction with the first aspect, a first possible embodiment of the first aspect is provided in an example of the present invention, wherein the calculating, according to distances from the current coordinates of the robot currently in an idle state to the coordinates of all the destinations and time for the robot moving from a current location to all the destinations, coordinates of a target destination nearest to the current coordinates comprises:

calculating a backflow path from the current coordinates of the robot currently in an idle state to coordinates of each of the destinations;

calculating, according to the distances and the time corresponding to the backflow paths, a first matching cost between the current coordinates of the robot currently in an idle state and the coordinates of each of the destinations;

comparing a plurality of the first matching costs calculated, and choosing smallest one from the plurality of the first matching costs; and determining coordinates of a destination in the backflow path corresponding to the chosen smallest first matching cost as the coordinates of the target destination nearest to the current coordinates.

In conjunction with the first possible embodiment of the first aspect, a second possible embodiment of the first aspect is provided in an example of the present invention, wherein the calculating a backflow path from the current coordinates of the robot to coordinates of each of the destinations comprises:

acquiring current coordinates of other robots; and calculating, according to the current coordinates of the robot currently in an idle state and the current coordinates of the other robots, the backflow path from the current coordinates of the robot currently in an idle state to the coordinates of each of the destinations.

In conjunction with the first aspect, a third possible embodiment of the first aspect is provided in an example of the present invention, wherein the method further comprises:

judging whether electric quantity of the robot currently in an idle state reaches standard electric quantity;

determining, when the electric quantity of the robot currently in an idle state is detected to be lower than the standard electric quantity, the corresponding robot as a to-be-charged robot;

acquiring coordinates of all charging stations which the to-be-charged robot is going to return to, wherein coordinates of the charging stations comprise coordinates of a plurality of charging stations and the coordinates of the plurality of charging stations are all located in the predetermined zones outside the working area;

calculating, according to distances from the current coordinates of the to-be-charged robot to coordinates of all the charging stations and time for the robot moving from current location to destinations, coordinates of a target charging station nearest to the current coordinates of the to-be-charged robot; and controlling the to-be-charged robot to move out of the working area according to a backflow path corresponding to the coordinates of the target charging station, so as to ensure that the to-be-charged robot orderly moves into the target charging station for charging.

In conjunction with the third possible embodiment of the first aspect, a fourth possible embodiment of the first aspect is provided in an example of the present invention, wherein the calculating, according to distances from the current coordinates of the to-be-charged robot to coordinates of all the charging stations and time for the to-be-charged robot, coordinates of a target charging station nearest to the current coordinates of the to-be-charged robot comprises:

calculating a backflow path from the current coordinates of the to-be-charged robot to coordinates of each of the charging stations;

calculating, according to the distances and the time corresponding to the backflow paths, a second matching cost between the current coordinates of the to-be-charged robot and the coordinates of each of the charging stations;

comparing a plurality of the second matching costs calculated, and choosing smallest one from the plurality of the second matching costs; and determining coordinates of a charging station in the backflow path corresponding to the chosen smallest second matching cost as the coordinates of a target charge station nearest to the current coordinates of the to-be-charged robot.

In conjunction with the first aspect, a fifth possible embodiment of the first aspect is provided in an example of the present invention, wherein data connections with a plurality of robots are respectively established, and it further comprises:

determining a crowding point zone;

setting, according to pass requests sent by individual robots in the crowding point zone, scheduling commands respectively for the individual robots in the crowding point zone; and sending the scheduling commands respectively to the individual robots in the crowding point zone, so that robots having received the scheduling commands pass through the crowding point zone according to the scheduling commands.

In conjunction with the fifth possible embodiment of the first aspect, a sixth possible embodiment of the first aspect is provided in an example of the present invention, wherein the determining a crowding point zone comprises:

acquiring paths of the plurality of robots;

determining a crowding point according to the paths of the plurality of robots; and determining the crowding point zone from zones adjacent to the crowding point.

In conjunction with the sixth possible embodiment of the first aspect, a seventh possible embodiment of the first aspect is provided in an example of the present invention, wherein the pass request includes: a position of the robot in the crowding point zone.

In conjunction with the first aspect, an eighth possible embodiment of the first aspect is provided in an example of the present invention, wherein the setting, according to pass requests sent by individual robots in the crowding point zone, scheduling commands respectively for individual robots in the crowding point zone comprises:

Setting, according to time sequence of the pass requests sent by individual robots in the crowding point zone and positions of the individual robots in the crowding point zone included in the pass requests, the scheduling commands respectively for the individual robots in the crowding point zone.

In conjunction with the first aspect, a ninth possible embodiment of the first aspect is provided in an example of the present invention, wherein the scheduling command includes: time when a robot starts to operate in the crowding point zone, a path for the robot passing through the crowding point zone and a speed for the robot passing through the crowding point zone.

In a second aspect, an example of the present invention further provides an apparatus for working-place backflow of robots, comprising:

a first acquiring module, configured to acquire current coordinates of a robot currently in an idle state in a working area;

a second acquiring module, configured to acquire coordinates of all destinations which the robot currently in an idle state is going to return to, wherein the coordinates of the destinations comprise coordinates of a plurality of destinations and the coordinates of the plurality of destinations are all located at outside of the working area; a plurality of storage areas are located outside of the working area, with the plurality of storage areas at different zones, and the coordinates of the plurality of the destinations are all set in the storage areas at predetermined zones outside the working area;

a first calculating module, configured to calculate, according to distances from the current coordinates of the robot currently in an idle state to the coordinates of all the destinations and time for the robot currently in an idle state, coordinates of a target destination nearest to the current coordinates; and a first controlling module, configured to control the robot currently in an idle state to move out of the working area according to a backflow path corresponding to the coordinates of the target destination, so as to ensure that the robot currently in an idle state departs orderly.

In conjunction with the second aspect, a first possible embodiment of the second aspect is provided in an example of the present invention, wherein the first calculating module comprises:

a first calculating unit, configured to calculate a backflow path from the current coordinates of the robot currently in an idle state to coordinates of each of the destinations;

a second calculating unit, configured to calculate, according to the distances and the time corresponding to the backflow paths, a first matching cost between the current coordinates of the robot currently in an idle state and the coordinates of each of the destinations;

a first comparing unit, configured to compare a plurality of the first matching costs calculated;

a first choosing unit, configured to choose smallest one from the plurality of the first matching costs obtained by comparison of the first comparing unit; and a first determining unit, configured to determine coordinates of a destination in the backflow path corresponding to the chosen smallest first matching cost as the coordinates of the target destination nearest to the current coordinates.

In conjunction with the first possible embodiment of the second aspect, a second possible embodiment of the second aspect is provided in an example of the present invention, wherein the first calculating unit comprises:

an acquiring sub-unit, configured to acquire current coordinates of other robots; and a calculating sub-unit, configured to calculate, according to the current coordinates of the robot currently in an idle state and the current coordinates of the other robots, the backflow path from the current coordinates of the robot currently in an idle state to the coordinates of each of the destinations.

In conjunction with the second aspect, a third possible embodiment of the second aspect is provided in an example of the present invention, wherein the apparatus further comprises:

a judging module, configured to judge whether electric quantity of the robot currently in an idle state reaches standard electric quantity;

a first determining module, configured to determine, when the electric quantity of the robot currently in an idle state is detected to be lower than the standard electric quantity, the corresponding robot as a to-be-charged robot;

a second acquiring module, configured to acquire coordinates of all charging stations which the to-be-charged robot is going to return to, wherein coordinates of the charging stations comprise coordinates of a plurality of charging stations and the coordinates of the plurality of charging stations are all located in predetermined zones outside the working area;

a second calculating module, configured to calculate, according to distances from the current coordinates of the to-be-charged robot to the coordinates of all the charging stations and time for the to-be-charged robot, coordinates of a target charging station nearest to the current coordinates of the to-be-charged robot; and a second controlling module, configured to control the to-be-charged robot to move out of the working area according to a backflow path corresponding to the coordinates of the target charging station, so as to ensure that the to-be-charged robot orderly moves into the target charging station for charging.

In conjunction with the third possible embodiment of the second aspect, a fourth possible embodiment of the second aspect is provided in an example of the present invention, wherein the second calculating module comprises:

a third calculating unit, configured to calculate the backflow path from the current coordinates of the to-be-charged robot to the coordinates of each of the charging stations;

a fourth calculating unit, configured to calculate, according to distances and time corresponding to the backflow paths, a second matching cost between the current coordinates of the to-be-charged robot and the coordinates of each of the charging stations;

a second comparing unit, configured to compare a plurality of the second matching costs calculated;

a second choosing unit, configured to choose smallest one from the plurality of the second matching costs obtained by comparison of the second comparing unit; and a second determining unit, configured to determine coordinates of a charging station in the backflow path corresponding to the chosen smallest second matching cost as the coordinates of the target charge station nearest to the current coordinates of the to-be-charged robot.

In conjunction with the third possible embodiment of the second aspect, a fifth possible embodiment of the second aspect is provided in an example of the present invention, wherein the apparatus respectively establishes data connections with a plurality of robots, and further comprises:

a second determining module, configured to determine a crowding point zone;

a setting module, configured to set, according to pass requests sent by individual robots in the crowding point zone, scheduling commands respectively for the individual robots in the crowding point zone; and a sending module, configured to send the scheduling commands respectively to the individual robots in the crowding point zone, so that robots having received the scheduling commands pass through the crowding point zone according to the scheduling commands.

In conjunction with the third possible embodiment of the second aspect, a sixth possible embodiment of the second aspect is provided in an example of the present invention, wherein the second determining module comprises:

an acquiring unit, configured to acquire paths of the plurality of robots;

a crowding point determining unit, configured to determine a crowding point according to the paths of the plurality of robots; and a crowding point zone determining unit, configured to determine the crowding point zone from zones adjacent to the crowding point.

In conjunction with the third possible embodiment of the second aspect, a seventh possible embodiment of the second aspect is provided in an example of the present invention, wherein the pass request includes: a position of the robot in the crowding point zone.

In conjunction with the third possible embodiment of the second aspect, an eighth possible embodiment of the second aspect is provided in an example of the present invention, wherein the setting module is configured to set, according to time sequence of the pass requests sent by the individual robots in the crowding point zone and positions of the individual robots in the crowding point zone included in the pass requests, the scheduling commands respectively for the individual robots in the crowding point zone.

In conjunction with the third possible embodiment of the second aspect, a ninth possible embodiment of the second aspect is provided in an example of the present invention, wherein the scheduling command includes: time when a robot starts to operate in the crowding point zone, a path for the robot passing through the crowding point zone and a speed for the robot passing through the crowding point zone In the methods and the apparatuses for working-place backflow of robots provided in the examples of the present invention, they comprise: firstly acquiring the current coordinates of a robot currently in an idle state in the working place and coordinates of all destinations to be returned to; then calculating, according to distances from the current coordinates of the robot to the coordinates of all the destinations and time for the robot, coordinates of a target destination nearest to the current coordinates, and finally controlling the robot to move out of the working place according to a backflow path corresponding to the coordinates of target the destination, so as to ensure that the robot in an idle state departs orderly. Compared with the prior art in which the problem of ordered departure of the robot cluster of a large quantity and a high density, after activities in the place are over, has not been effectively solved, they calculate coordinates of the target destination according to the distances from the current coordinates of the real-time positioned robot in an idle state to coordinates of all destinations and time for the robot in an idle state, and control the robot to move out of the working area according to the backflow path corresponding to the calculated coordinates of the target destination, ensuring that the robot orderly moves out of the working area place as soon as possible after delivering the goods, effectively reducing the quantity of the idle robots in the place, meanwhile also reducing the possibility of intersection of the paths of the robots, moreover, when intersection of the paths of the robots occur, the robots are subjected to queuing management, and by respectively establishing the data connections with a plurality of robots, the crowding point zone is determined; according to pass requests sent by individual robots in the crowding point zone and the paths of individual robots in the crowding point zone, scheduling commands are set respectively for the individual robots in the crowding point zone; the scheduling commands are sent respectively to the individual robots in the crowding point zone, so that the robots having received the scheduling commands pass through the crowding point zone according to the scheduling commands, avoiding occurrence of crowding of the robots in the crowding point zone, increasing the speeds for the robots passing through the crowding point, and improving the working efficiency of the robots in the place and the overall working efficiency of the robot cluster.

In order to make it more apparent and easier to understand the above objects, features and advantages of the present invention, preferable examples are specifically illustrated to make the following detailed description in conjunction with the accompanying drawings.

BRIEF DESCRIPTION OF DRAWINGS

In order to more clearly illustrate technical solutions of examples of the present invention, figures which are needed for description of the examples will be introduced briefly below. It should be understood that the figures below merely show some examples of the present invention, and therefore should not be considered as limiting the scope. A person ordinarily skilled in the art still can also obtain other relevant figures according to these figures, without using inventive efforts.

DETAILED DESCRIPTION OF EMBODIMENTS

Below the technical solutions of the examples of the present invention will be described clearly and completely in conjunction with figures of the examples of the present invention. Apparently, some but not all of examples of the present invention are described. Generally, components in the examples of the present invention described and shown in the figures herein may be arranged and designed in different configurations. Therefore, the detailed description below of the examples of the present invention provided in the figures is not intended to limit the protection scope of the present invention, but merely represents chosen examples of the present invention. Based on the examples of the present invention, all the other examples, obtained a person skilled in the art without using inventive efforts, fall within the protection scope of the present invention.

The emergence of robots has provided relatively great help to the development of social economy, for example, they can satisfy the demand resulted from continuous increasing of the scale and quantity of large-scale places for logistics and people such as supermarkets, airports, stations, exhibition centers, logistics warehouses and so on, for example, the robot, when applied to the logistics field, can be used as a transport device to carry the goods in a storage area from the storage area to a delivering area (i.e. goods arrangement area) and deliver the goods, and returns to the corresponding storage area. However, in the situation that there is only one storage area and one goods arrangement area mentioned above, the path of each robot is singular, it is relatively easy to control the movement path of the robot in this case, but when there are relatively a lot of the above above-mentioned storage areas and goods arrangement areas, there also will be relatively a lot of corresponding robot paths, at this time, when a cluster of robots of a large quantity and a high density carry out large-scale dynamic activities above in the place, each robot, after delivering or carrying the goods, needs to depart orderly as soon as possible more, while the robots going to depart might affect other robots being working in the place; besides, when the cluster of robots have one necessary point to pass through on the backflow paths in the place, if this point should be passed through within a short period of time, crowding may easily occur, resulting in reduction of the overall working efficiency, therefore, an optimized departure scheduling plan is needed so as to improve the working efficiency.

Figure 1:
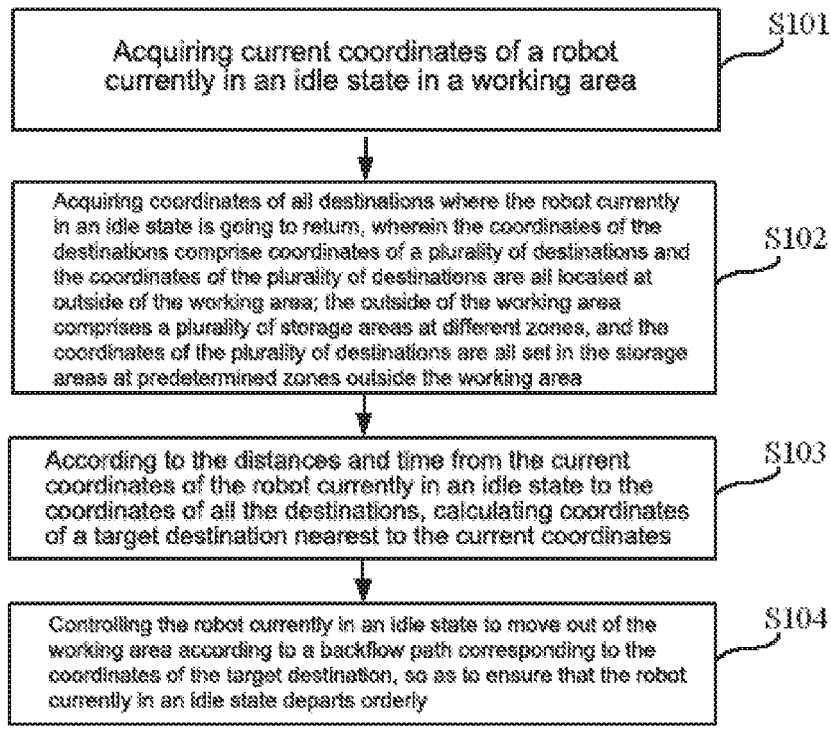
FIG. 1 shows a flow chart of a method for working-place backflow of robots provided in an example of the present invention.

In this regard, referring to FIG. 1, an example of the present invention provides a method for working-place backflow of robots, and the method comprises the following steps:

S101: acquiring current coordinates of a robot currently in an idle state in a working area.

Specifically, the robot in the working area, after delivering carried goods, is then in an idle state, at this time, firstly current coordinates of the robot currently in an idle state are acquired, i.e. the current coordinates of the robot currently in an idle state are determined.

But in fact, the working place is provided with a plurality of delivering areas (i.e. goods arrangement areas) for the robots, and determining the current coordinates of the robot broadly refers to determining a position of a delivering area where the robot is performing delivery currently.

Specifically, the above working area for the robot can be divided into a plurality of spaces (the spaces can be construed as those having a predetermined length and width), and each space is corresponding to coordinates of a position, wherein each space only can receive one robot, and when one space is occupied by one robot, this space can no longer receive another robot, that is, two or more robots cannot simultaneously occupy one and the same space.

Therefore, determining the current coordinates of the robot having finished the delivery of goods refers to acquiring (i.e. determining) a position of the space where the robot having finished the delivery of goods is located.

S102: acquiring coordinates of all destinations which the robot currently in an idle state is going to return to, wherein the coordinates of the destinations comprise coordinates of a plurality of destinations and the coordinates of the plurality of destinations are all located at outside of the working area; a plurality of storage areas are located outside of the working area, with the plurality of storage areas at different zones, and the coordinates of the plurality of destinations are all set in the storage areas at predetermined zones outside the working area.

In the above, there may be coordinates of a plurality of the destinations above, and the coordinates of the plurality of destinations are located at outside of the working area, and a plurality of storage areas are located outside of the working area, with the plurality of storage areas at different zones, and the coordinates of the plurality of destinations above are just correspondingly set in the storage areas at the predetermined zones outside the working area.

Specifically, after determining the position of the space where the robot having finished the delivery of goods is located, it further needs to determine coordinates of all destinations of the storage areas outside the working area, which the robot in an idle state is going to depart (i.e. going to return to), so as to calculate coordinates of a target destination nearest to the current coordinates according to backflow paths of the determined current coordinates and the coordinates of all destinations.

S103: according to the distances from the current coordinates of the robot currently in an idle state to the coordinates of all the destinations and time for the robot currently in an idle state, calculating coordinates of a target destination nearest to the current coordinates.

Specifically, after determining the current coordinates of the robot currently in an idle state and the coordinates of all the destinations, according to the distances from the current coordinates of the robot currently in an idle state to the coordinates of individual destinations and time for the robot currently in an idle state, an optimal combination corresponding to the combination of the distance and the time is calculated, and then the coordinates of the destination corresponding to the optimal combination serve as the coordinates of the target destination nearest to the current coordinates.

In the above, the distances (i.e. travel paths) from the current coordinates of the robot currently in an idle state to the coordinates of individual destinations are determined upon comprehensively considering paths of a plurality of robots, and paths of the robot currently in an idle state corresponding to the distances (i.e. travel paths) will not overlap with those of other robots (including other robots in an idle state and robots in a working state) (i.e. avoiding that two or more robots simultaneously occupy one idle space), thus all the robots in an idle state may orderly return to the coordinates of the destinations in the storage areas, so as to carry out the next cyclic working process of picking up the goods, transporting, unloading the goods (i.e. delivering) and departing.

S104: controlling the robot currently in an idle state to move out of the working area according to a backflow path corresponding to the coordinates of the target destination, so as to ensure that the robot currently in an idle state departs orderly.

Specifically, the robot currently in an idle state is controlled to move out of the working area according to the backflow path corresponding to the coordinates of the target destination calculated above, and to return to the coordinates of the target destination in the corresponding storage area, so as to ensure that the robot orderly moves out of the working area place as soon as possible after delivering the goods, effectively reduce the quantity of the idle robots in the place, meanwhile also reduce the probability of intersection of the paths for the robots, and improve the working efficiency of the robots in the place.

Compared with the prior art in which the problem of ordered departure of the robot cluster of a large quantity and a high density after activities in the place are over has not been effectively solved, the method for working-place backflow of robots provided in the example of the present invention, in which the coordinates of the target destination are calculated according to the distances from the current coordinates of the real-time positioned robot in an idle state to coordinates of all destinations and time for the robot and the robot is controlled to move out of the working area according to the backflow path corresponding to the calculated coordinates of the target destination, ensures that the robot orderly moves out of the working area place as soon as possible after delivering the goods, effectively reduces the quantity of the idle robots in the place, meanwhile also reduces the possibility of intersection of the paths for the robots, and improves the working efficiency of the robots in the place.

A plurality of storage areas are located outside of the working area, with the plurality of storage areas at different zones, and the coordinates of the plurality of destinations are all set in the storage areas at the predetermined zones outside the working area. In order to further ensure that the robot orderly moves out of the working area place as soon as possible after delivering the goods, the storage area of the coordinates of the target destination nearest to the robot in an idle state may be calculated according to the current coordinates of the robot in an idle state, and then the robot in an idle state is controlled to move out of the working area along the backflow path of the storage area of the target destination coordinates, thus the robot can be enabled to depart more quickly.

Figure 2:
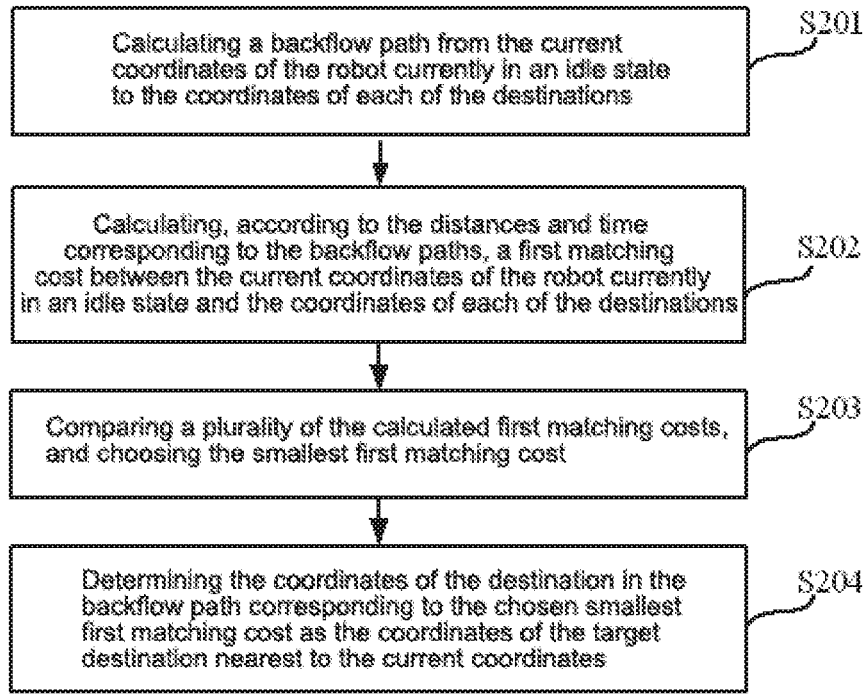
FIG. 2 shows a flow chart of another method for working-place backflow of robots provided in an example of the present invention.

Specifically, referring to FIG. 2, the above step S103 specifically comprises:

S201: calculating a backflow path from the current coordinates of the robot currently in an idle state to the coordinates of each of the destination.

Specifically, a plurality of storage areas are located outside of the working area, with the plurality of storage areas at different zones, and the coordinates of the plurality of the destinations are all set in the storage areas at the predetermined zones outside the working area. In order to facilitate determining the coordinates of the target destination nearest to the current coordinates of the robot currently in an idle state, firstly the backflow path from the current coordinates of the robot currently in an idle state to the coordinates of each of the destinations is calculated, and the backflow path carries distance and time parameters.

Preferably, a manner of determining the backflow path comprises: firstly acquiring current coordinates of other robots in the place, and then calculating, according to the current coordinates of the robot currently in an idle state and the current coordinates of other robots in the place, the backflow path from the current coordinates of the robot currently in an idle state to the coordinates of each of the destinations, for the purpose of ensuring that the path for the robot in an idle state moving out of the working area will not overlap with those for other robots, i.e. avoiding that two or more robots simultaneously occupy one idle space.

S202: calculating, according to the distances and time corresponding to the backflow paths, a first matching cost between the current coordinates of the robot currently in an idle state and the coordinates of each of the destinations.

Specifically, according to the backflow path determined in the above step 201, the first matching cost including the distance and time parameters is calculated; specifically, a manner of calculating the first matching cost may be: the first matching cost=distance×weighted distance+time×weighted time; alternatively, the manner of calculating the first matching cost may be: the first matching cost=the product of distance×weighted distance and time×weighted time.

It should be indicated that the manner of calculating the first matching cost in the example of the present invention is not merely limited to the above two calculating manners, and this calculating manner in the present invention is not specifically limited.

S203: comparing a plurality of the first matching costs calculated, and choosing the plurality of the first matching costs.

Specifically, any one of the above calculating manners is chosen to calculate the first matching cost, and then all of the first matching costs obtained from the above calculation are compared, to choose the matching cost whose obtained numerical value result is the smallest, so as to subsequently take coordinates of a destination corresponding to the chosen matching cost, whose numerical value is smallest, as the coordinates of the target destination nearest to the current coordinates.

S204: determining the coordinates of the destination in the backflow path corresponding to the chosen smallest first matching cost as the coordinates of the target destination nearest to the current coordinates.

Figure 3:
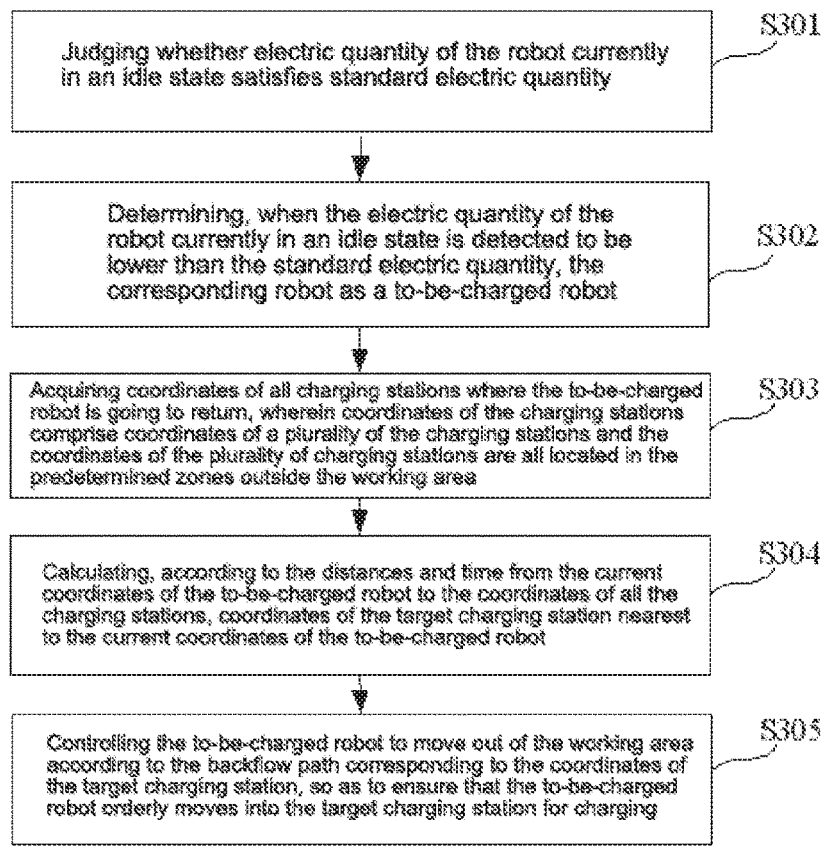
FIG. 3 shows a flow chart of another method for working-place backflow of robots provided in an example of the present invention.

Considering the problem that the robot in an idle state may have low electric quantity, which causes that the robot may not able to complete the next process from picking up the goods, delivery to returning, or considering the problem that the electric quantity of the robot in an idle state is insufficient to complete the farthest backflow path from a goods delivery point in the whole working area to the point of picking up the goods outside the working area, the electric quantity condition of the robot should also be detected in real time, and the robot, which is in the case of low electric quantity, is controlled to go to a robot charging station outside the working area for charging. Referring to FIG. 3, specific implementation is as follows:

S301: judging whether electric quantity of the robot currently in an idle state reaches standard electric quantity.

The standard electric quantity in the example of the present invention is the electric quantity that can enable a robot to complete the farthest path from picking up the goods, carrying the goods, unloading the goods to returning to the storage area; after the current robot has completed the process of unloading the goods, firstly whether the residual electric quantity of this robot in an idle state is lower than the standard electric quantity, and if the residual electric quantity of this robot in an idle state is lower than the standard electric quantity, there is a need to timely dispatch this robot to go to the robot charging station for charging, so as to ensure that this robot in an idle state can successfully complete the next round of work from picking up the goods, carrying the goods, unloading the goods to returning to the storage area.

S302: determining, when the electric quantity of the robot currently in an idle state is detected to be lower than the standard electric quantity, the corresponding robot as a to-be-charged robot.

Specifically, when the residual electric quantity of the above robot currently in an idle state is detected to be lower than the standard electric quantity, in order to timely dispatch the robot in an idle state to be charged, firstly this robot is determined as a to-be-charged robot, so as to subsequently unifiedly dispatch the to-be-charged robot to go to the robot charging station.

S303: acquiring coordinates of all charging stations which the to-be-charged robot is going to return to, wherein coordinates of the charging stations comprise coordinates of a plurality of the charging stations and the coordinates of the plurality of charging stations are all located in the predetermined zones outside the working area.

In fact, after a position of a space where the to-be-charged robot is located is determined, there is also a need to determine coordinates of charging stations which the to-be-charged robot is going to depart (i.e. going to return to), so as to calculate coordinates of a target charging station nearest to the current coordinates according to the backflow paths of the determined current coordinates and the coordinates of all the charging stations.

S304: calculating, according to the distances from the current coordinates of the to-be-charged robot to the coordinates of all the charging stations and time for the to-be-charged robot, coordinates of the target charging station nearest to the current coordinates of the to-be-charged robot.

Specifically, after the current coordinates of the to-be-charged robot and the coordinates of all the charging stations are determined, according to the distances from the current coordinates of the to-be-charged robot to the coordinates of individual charging stations and time for the to-be-charged robot, an optimal combination corresponding to the combination of the distance and the time is calculated, and then the coordinates of the charging station corresponding to the optimal combination serve as the coordinates of the target charging station nearest to the current coordinates.

In the above, the distances (i.e. travel paths) from the current coordinates of the to-be-charged robot to the coordinates of the individual charging stations are determined upon comprehensive consideration of the paths of a plurality of robots, and paths of the to-be-charged robot corresponding to the distances (i.e. travel paths) will not overlap with those of other robots (including to-be-charged robots and the robots returning to the coordinates of target destinations later) (i.e. avoiding that two or more robots simultaneously occupy one idle space), thus the to-be-charged robot can be enabled to orderly return to the target charging station, so as to be subjected to charging, and then to carry out the next cyclic working process of picking up the goods, carrying, unloading the goods (i.e. delivering) and departing.

S305: controlling the to-be-charged robot to move out of the working area according to the backflow path corresponding to the coordinates of the target charging station, so as to ensure that the to-be-charged robot orderly moves into the target charging station for charging.

Specifically, this to-be-charged robot is controlled to move out of the working area according to the backflow path corresponding to the coordinates of the target charging station calculated above, and to move into the robot charging station corresponding to the coordinates of the charging station, so as to ensure that the to-be-charged robot orderly moves out of the working area place as soon as possible for charging, effectively reduce the quantity of the idle robots in the place, and meanwhile also reduce the probability of intersection of paths for the robots, and improve the working efficiency of the robots in the place.

Figure 4:
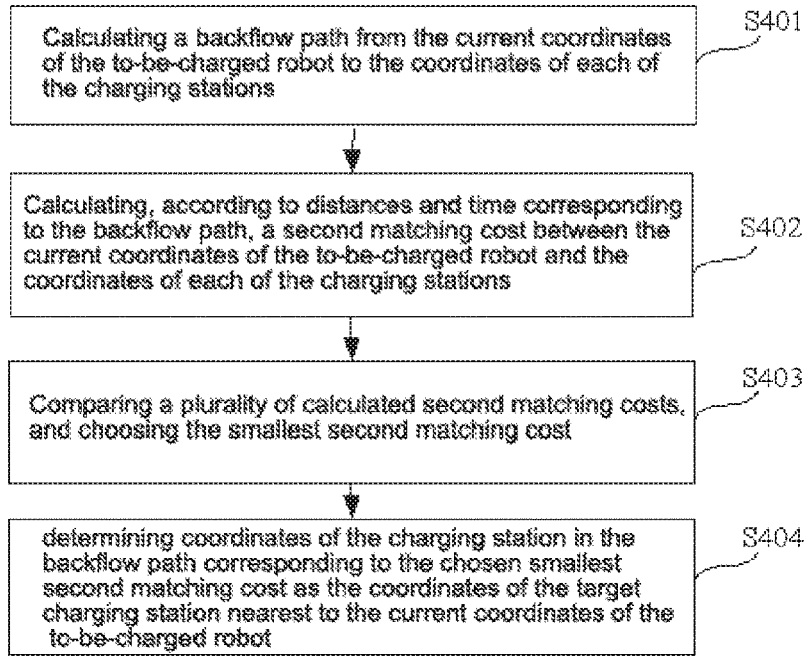
FIG. 4 shows a flow chart of another method for working-place backflow of robots provided in an example of the present invention.

A plurality of robot charging stations (including coordinates of the charging stations) are located outside of the working area, with the plurality of storage areas at different zones, and the coordinates of the plurality of charging stations are all set in the storage areas at predetermined zones. In order to further ensure that the robot orderly, after delivering the goods, leaves the working area place as soon as possible to go to the robot charging station, coordinates of the target charging station nearest to this robot in an idle state may be calculated according to the current coordinates of this robot in an idle state, and then this robot in an idle state is controlled to move out of the working area along the backflow path of the coordinates of the target charging station, thus the robot can be enabled to depart more quickly. In this regard, referring to FIG. 4, in an example of the present invention, specific implementation of the above step 304 is as follows:

S401: calculating a backflow path from the current coordinates of the to-be-charged robot to the coordinates of each of the charging stations.

In order to facilitate determining the coordinates of the target charging station nearest to the current coordinates of the to-be-charged robot, firstly the backflow path from the current coordinates of the above to-be-charged robot to the coordinates of each of the charging stations, and the backflow path carries distance and time parameters.

Preferably, a manner of determining the backflow path comprises: firstly acquiring current coordinates of other robots; then calculating, according to the current coordinates of the to-be-charged robot and the current coordinates of other robots, the backflow path from the current coordinates of the to-be-charged robot to the coordinates of each of the charging stations, for the purpose of ensuring that the path for the to-be-charged robot moving out of the working area will not overlap with those for other robots, i.e. avoiding that two or more robots simultaneously occupy one idle space.

S402: calculating, according to distances and time corresponding to the backflow path, a second matching cost between the current coordinates of the to-be-charged robot and the coordinates of each of the charging stations. Specifically, according to the backflow paths determined in the above step 401, the second matching cost including the distance and time parameters is calculated; specifically, a manner of calculating the second matching cost may be: the second matching cost=distance×weighted distance+time×weighted time; alternatively, a manner of calculating the second matching cost may be: the second matching cost=the product of distance×weighted distance and time×weighted time.

It should be indicated that the manner of calculating the second matching cost in the example of the present invention are not merely limited to the above two calculating manners, and the calculating manner in the present invention is not specifically limited.

S403: comparing a plurality of second matching costs calculated, and choosing smallest one from the plurality of the second matching costs.

Specifically, any one of the above calculating manners is chosen to calculate the second matching cost, and then all of the second matching costs obtained from the above calculation are compared, to choose the matching cost whose obtained numerical value result is the smallest, so as to subsequently take coordinates of a charging station corresponding to the chosen matching cost, whose numerical value is smallest, as the coordinates of the target charging station nearest to the current coordinates.

S404: determining coordinates of the charging station in the backflow path corresponding to the chosen smallest second matching cost as the coordinates of the target charging station nearest to the current coordinates of the to-be-charged robot.

Figure 5:
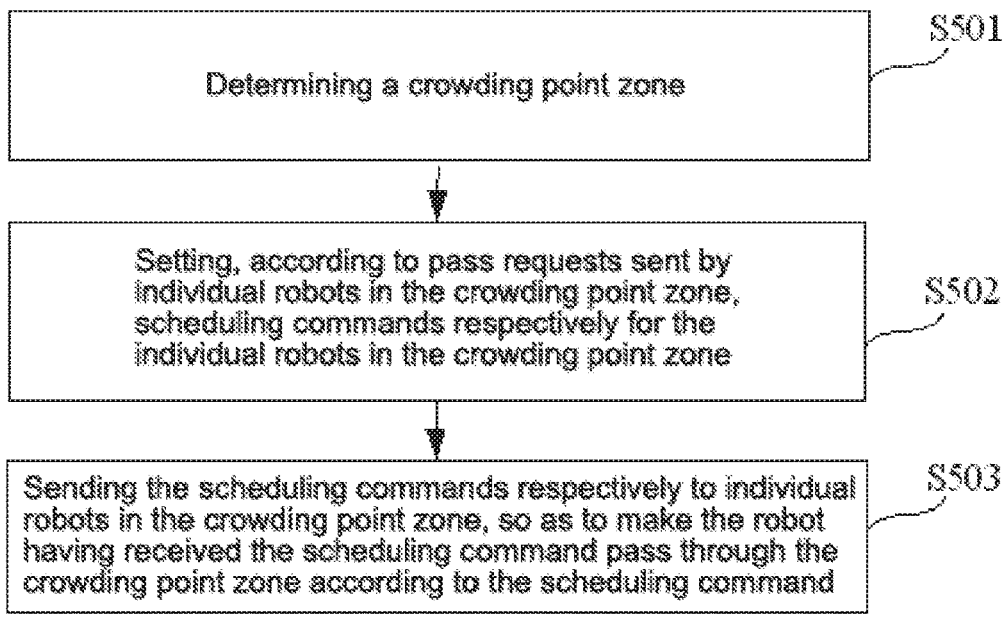
FIG. 5 shows a flow chart of another method for working-place backflow of robots provided in an example of the present invention.

Further, referring to FIG. 5, when intersection of the paths of the robots occur, the robots are subjected to queuing management, data connections with a plurality of robots are respectively established, and the above method further comprises:

Step S501: determining a crowding point zone;

In the example of the present invention, a server establishes data connections with a plurality of robots (including the robots in an idle state and the robots in a working state) in the place, to further acquire paths of the plurality of robots (including the backflow paths of the robots in an idle state and the travel paths of the robots in a working state), and analyzes the backflow paths of the plurality of robots, to determine a site with a high occurrence frequency in the paths as a crowding point, and to determine a crowding point zone from zones adjacent to the crowding point, wherein the crowding point zone is different from a queuing zone where the robots are arranged in one row with the robot first entering the crowding point zone standing first, but comprises respective positions where the robots scatter in the crowding point zone.

Step S502: setting, according to pass requests sent by individual robots in the crowding point zone, scheduling commands respectively for the individual robots in the crowding point zone.

In the above, the pass request includes, but not limited to: a position of the robot in the crowding point zone. Each robot, entering the crowding point zone, will be triggered to send a pass request to the server, and the server sets, according to the time sequence of the pass requests sent by individual robots in the crowding point zone and positions of individual robots in the crowding point zone included in the pass requests, scheduling commands respectively for the individual robots in the crowding point zone.

Specifically, for setting the scheduling commands for the robots in the crowding point zone, the following factors should be comprehensively considered:

(1) the time sequence of the pass requests sent by the robots;

each request sent by the robots has time limitation, and in order to avoid timeout of response to the pass requests sent by the robots, and to avoid that the robot preferentially arriving at the crowding point zone cannot preferentially pass through the crowding point zone, when the server sets the scheduling commands for the robots, setting needs to be performed according to the time sequence of the pass requests sent by the robots.

(2) the positions of the robots in the crowding point zone;

the crowding point zone is a zone adjacent to the crowding point, individual robots, after entering the crowding point zone, scatter at various positions in the crowding point zone, rather than being arranged in one row, with the robot preferentially entering the crowding point zone standing first, when a path for a certain robot passing through the crowding point is blocked by other robots, in order to be capable of quickly passing through the crowding point zone, the scheduling commands can be set for the robot blocking other robots, to make the same preferentially pass through the crowding point zone.

In the above, according to different requirements of the server on the robots passing through the crowding point zone, the preferential level of the factors (1) and (2) can be adaptively adjusted. For example, when the server has a relatively high timeliness requirement on the pass requests of the robots entering the crowding point zone, the proportion of the factor (1) is increased; and when the server has a relatively low timeliness requirement on the pass requests of the robots entering the crowding point zone and a relatively high overall efficiency requirement on the robot passing through the crowding point zone, the proportion of the factor (2) is increased.

In should be noted that in order to increase the speed of the robot passing through the crowding point zone, each robot should pass through the crowding point zone at the maximum travel speed, moreover, considering that the maximum travel speeds of individual robot are different, in order to avoid crowding of the robots in the crowding point zone, the server should set the scheduling command for each robot according to the maximum travel speed of each robot.

In the above, the scheduling command includes, but not limited to: the time when a robot starts to operate in the crowding point zone, a path for the robot passing through the crowding point zone and a speed for the robot passing through the crowding point zone.

It should be noted that a manner of the scheduling command including the time when the robot starts to operate in the crowding point zone comprises:

A. directly carrying the time when starting to operate in the scheduling command; and B. when achieving the time when the robot start to operate, sending to the robot the scheduling command including a path for the robot passing through the crowding point zone and a speed for the robot passing through the crowding point zone.

It should be noted that after entering the crowding point zone, the robot is in a standby state, and starts to pass through the crowding point zone according to the scheduling command only after receiving the scheduling command, wherein since the time period for the server setting the scheduling command is negligible for being very short, the time period for the robot in the standby state is not long, and it will not affect the speed for the robot passing through the crowding point zone.

Step S503: sending the scheduling commands respectively to individual robots in the crowding point zone, so as to make the robot having received the scheduling command pass through the crowding point zone according to the scheduling command.

The server, after setting the scheduling command for each robot in the crowding point zone, sends the scheduling command for each robot to the corresponding robot, and the robot, upon receiving the scheduling command, starts, according to the time when starting to operate in the scheduling command, to pass through the crowding point zone in the path and at the speed in the scheduling command.

In the method provided in the example of the present invention, further, the crowding point zone is determined; according to the pass requests sent by individual robots in the crowding point zone and the paths of individual robots in the crowding point zone, the scheduling commands are set respectively for the individual robots in the crowding point zone; the scheduling commands are respectively sent to the individual robots in the crowding point zone, so as to make the robots having received the scheduling commands pass through the crowding point zone according to the scheduling commands. The pass request of each robot in the crowding point zone is analyzed, and the respective scheduling command is set for each robot, avoiding occurrence of crowding of the robots in the crowding point zone, increasing the speeds for the robots passing through the crowding point, and further improving the overall working efficiency of the robot cluster.

Below, the above steps S501-S503 are illustrated in detail in conjunction with a specific application scene, wherein there are robots 1, 2 and a server in the system, and there is a robot working area in the place, wherein a point A is a certain node between the working area and the storage areas, robot charging areas and storage areas are referred to as C1, C2 ... CN, in order to facilitate setting of the backflow paths, the server makes the whole working area node-oriented, assigns coordinates (x,y) to each node (space), and sets a gravity value of the crowding point as (0,0), and then derive to surrounding nodes in such a way that increase of each one coordinate unit is followed by increase of one gravity unit, that is, the gravity value is the smallest distance from the coordinate point to the coordinate origin, wherein the gravity value=X coordinate+Y coordinate.

The server acquires that the path of the robot 1 is embodied as a certain position in the working area-A-C1, and that the path of the robot 2 is embodied as a certain position in the working area-A-C2. Upon analysis, the server determines that all of the robots will pass through the point A, and the frequency of occurrence of the point A is the highest, therefore, A is determined as a crowding point, and a crowding point zone is chosen from zones adjacent to A. The robot is set to be triggered when entering the crowding point zone to send a pass request to the server.

Figure 6:
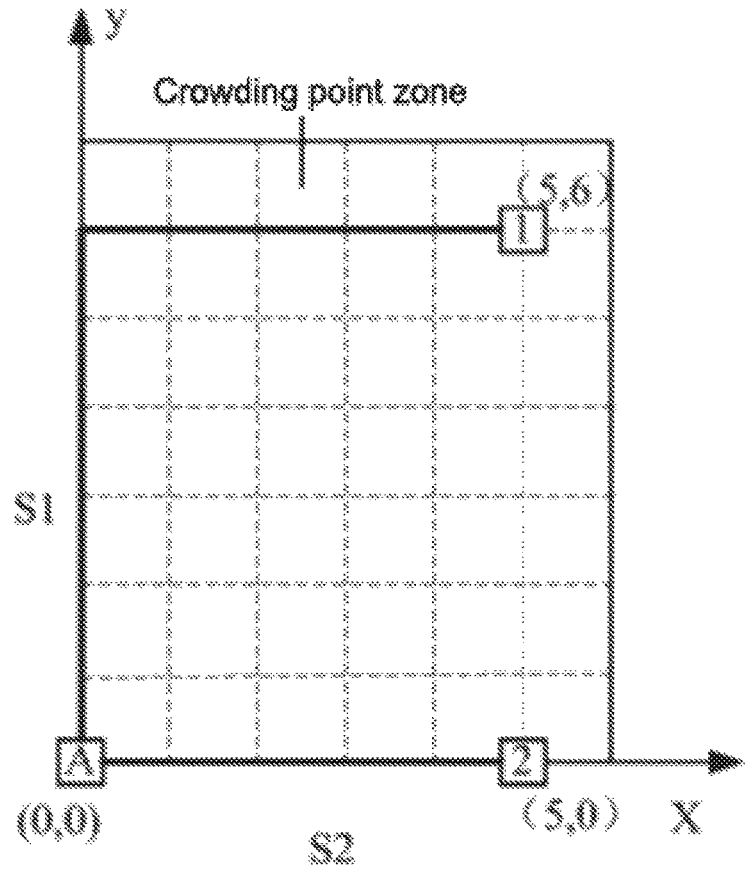
FIG. 6 shows a position schematic view of a robot 1 and a robot 2 in a crowding point zone provided in an example of the present invention.

After the robot 1 and the robot 2 successively enter the crowding point zone, they respectively send to the server their positions in the crowding point zone, as shown in FIG. 6, which is a position view of the robot 1 and the robot 2 in the crowding point zone provided in the present example, wherein coordinates of the position of the robot 1 are (5,6), with a gravity value of 11; coordinates of the position of the robot 2 are (5,0), with a gravity value of 5, and the robot 1 and the robot 2 have the smallest paths that do not overlap, wherein the path of the robot 1 is referred to as S1, and the path of the robot 2 is referred to as S2.

It can be seen from FIG. 6 that although the robot 1 sends the pass request to the server first, the robot 2 has a smaller gravity value, and is nearer to the position of the crowding point, if the time T1 for the robot 1 to pass through the crowding point A is later than the time T2 for the robot 2 to pass through the crowding point A, in order to improve the efficiency of the robots passing through the crowding point A, the smallest paths are chosen for the robot 1 and the robot 2 to pass through the crowding point A, and without affecting the robot 1 passing through the crowding point A at the same time, a scheduling command having the same time when starting to operate as the robot 1 is set for the robot 2, and in the scheduling command the path S1 of the robot 1 does not overlap with the path S2 of the robot 2, such as the paths S1 and S2 shown in FIG. 6, thus, the time for the robot 2 to pass through the crowding point A in the path S2 is saved, and further the overall speed of the robots 1, 2 passing through the crowding point A is increased.

If the time T1 for the robot 1 to pass through the crowding point A is earlier than the time T2 for the robot 2 to pass through the crowding point A (since the speed of each robot is different, if the speed of the robot 1 is greater than the speed of the robot 2, this situation will occur), the scheduling commands including the same time when starting to operate also can be set for the robot 1 and the robot 2, such that after the robot 1 passes through the crowding point A, the time of the robot 2 passing through the crowding point A is not affected, and further the overall speed of the robots 1, 2 passing through the crowding point A is improved.

If the time T1 for the robot 1 to pass through the crowding point A is the same as the time T2 for the robot 2 to pass through the crowding point A, when the server has requirement on the time sequence of the pass requests sent by the robots, the time when starting to operate included in the scheduling command set for the robot 1 can be prior to the time when starting to operate included in the scheduling command set for the robot 2, and the path S1 of the robot 1 and the path S2 of the robot 2 in the scheduling commands do not overlap, for example, the scheduling command set for the robot 1 is "pass through the crowding point A at 10:00 at a speed of 3 km/hour according to the path S1", and the scheduling command set for the robot 2 is "pass through the crowding point A at 10:01 at a speed of 3.5 km/hour according to the path S2".

Figure 7:
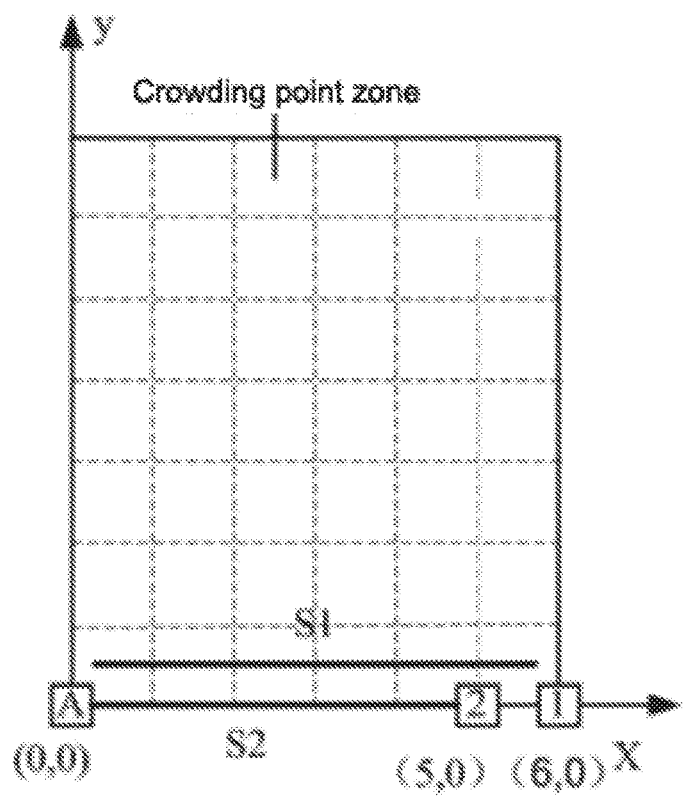
FIG. 7 shows another position schematic view of the robot 1 and the robot 2 in the crowding point zone provided in an example of the present invention.

As shown in FIG. 7, it is another position view of the robot 1 and the robot 2 in the crowding point zone provided in the present example, wherein coordinates of the position of the robot 1 are (6,0), with a gravity value of 6; coordinates of the position of the robot 2 are (5,0), with a gravity value of 5, and the path of the robot 1 is S1, the path of the robot 2 is S2, and the robot 2 is in the smallest path of the robot 1.

Although the robot 1 sends the pass request to the server first, the robot 2 is nearer to the crowding point A, if the time T1 for the robot 1 to pass through the crowding point A is later than the time T2 for the robot 2 to pass through the crowding point A, in order to improve the efficiency of the robots passing through the crowding point A, the scheduling commands including the same time when starting to operate are set for the robot 1 and the robot 2, wherein the path of the robot 1 is A1, the path of the robot 2 is S2, i.e. the time for the robot 2 to pass through the crowding point A is saved while not affecting the robot 1 passing through the crowding point A, and further the overall speed of the robots 1, 2 passing through the crowding point A is increased.

Figure 8:
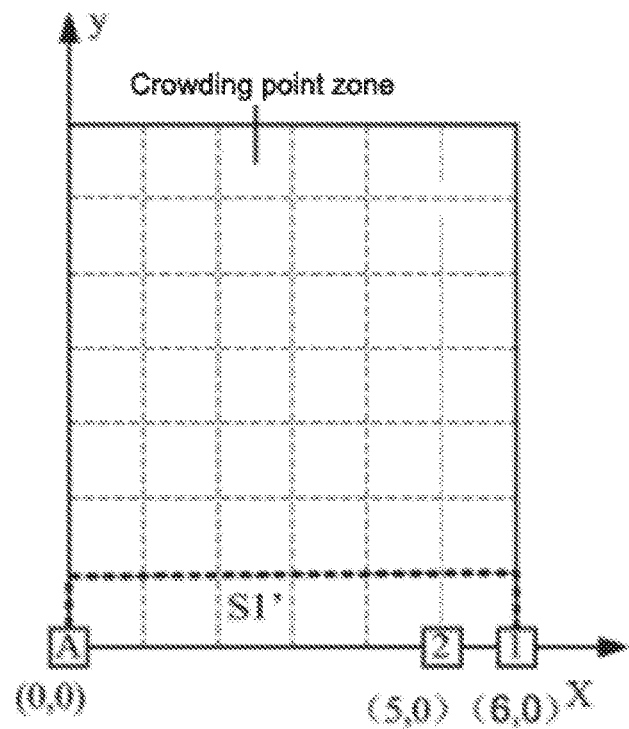
FIG. 8 shows a path diagram of the robot 1 and the robot 2 passing through the crowding point zone provided in an example of the present invention.

If the time T1 for the robot 1 to pass through the crowding point A is earlier than or the same as the time T2 for the robot 2 to pass through the crowding point A (since the speed of each robot is different, if the speed of the robot 1 is greater than the speed of the robot 2, this situation will occur), according to the time sequence of the pass requests sent by the robots, the time when starting to operate included in the scheduling command set for the robot 1 may be prior to the time when starting to operate included in the scheduling command set for the robot 2, wherein the path of the robot 1 is S1', wherein S1' is a path bypassing the robot 2 and passing through the crowding point A, such as S1' shown in FIG. 8. If the scheduling commands are set according to the positions of the robots in the crowding point zone, the time when starting to operate included in the scheduling command set for the robot 2 can be prior to the time when starting to operate included in the scheduling command set for the robot 1, and the path of the robot 1 is S1', and the path of the robot 2 is S2, so that the robot 2 passes through the crowding point A before the robot 1.

It should be noted that FIG. 6 and FIG. 7 are merely specific application scenes provided in the present example, and in practical application, the robot cluster are not limited to two robots, and all methods of setting the scheduling commands for individual robots in the crowding point zone according to the time sequence of the pass requests sent by the individual robots in the crowding point zone and the positions of the individual robots in the crowding point zone included in the pass requests provided in the present example should fall within the protection scope of the present invention.

In the method provided in the example of the present invention, further, the crowding point zone is determined; the scheduling commands are set respectively for individual robots in the crowding point zone according to the pass requests sent by the individual robots in the crowding point zone and the paths of the individual robots in the crowding point zone; the scheduling commands are sent respectively to the individual robots in the crowding point zone, so as to make the robots having received the scheduling commands pass through the crowding point zone according to the scheduling commands. The pass request of each robot in the crowding point zone is analyzed, and the respective scheduling command is set for each robot, avoiding occurrence of crowding of the robots in the crowding point zone, increasing the speeds for the robots passing through the crowding point, and improving the overall working efficiency of the robot cluster.

Compared with the prior art in which the problem of ordered departure of the robot cluster of a large quantity and a high density after activities in the place are over has not been effectively solved, the method for working-place backflow of robots provided in the example of the present invention calculates coordinates of the target destination according to the distances from the current coordinates of the real-time positioned robot in an idle state to coordinates of all destinations and time for the robot, and controls the robot to move out of the working area according to the backflow path corresponding to the calculated coordinates of the target destination, ensuring that the robot orderly moves out of the working area place as soon as possible after delivering the goods, effectively reducing the quantity of the idle robots in the place, and meanwhile also reducing the possibility of intersection of the paths for the robots; moreover, when intersection of the robot paths occurs, the robots are subjected to queuing management, and the crowding point zone is determined by respectively establishing data connections with a plurality of robots; the scheduling commands are respectively set for individual robots in the crowding point zone according to the pass requests sent by the individual robots in the crowding point zone and the paths of the individual robots in the crowding point zone; the scheduling commands are sent respectively to the individual robots in the crowding point zone, so that the robots having received the scheduling commands pass through the crowding point zone according to the scheduling commands, avoiding occurrence of crowding of the robots in the crowding point zone, increasing the speeds for the robots passing through the crowding point, and improving the working efficiency of the robots in the place and the overall working efficiency of the robot cluster.

Figure 9:
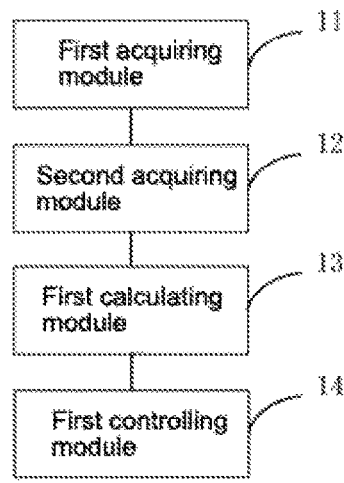
FIG. 9 shows a structural schematic diagram of an apparatus for working-place backflow of robots provided in an example of the present invention.

An example of the present invention further provides an apparatus for working-place backflow of robots. The apparatus is used to perform the above method for working-place backflow of robots. The apparatus can be provided in a server for controlling the operation of the robot. Referring to FIG. 9, the apparatus comprises:

a first acquiring module 11, configured to acquire current coordinates of a robot currently in an idle state in a working area;

a second acquiring module 12, configured to acquire coordinates of all destinations which the robot currently in an idle state is going to return to, wherein the coordinates of the destinations comprise coordinates of a plurality of destinations and the coordinates of the plurality of destinations are all located at outside of the working area; a plurality of storage areas are located outside of the working area, with the plurality of storage areas at different zones, and the coordinates of the plurality of destinations are all set in the storage areas at predetermined zones outside the working area;

a first calculating module 13, configured to calculate, according to the distances from the current coordinates of the robot currently in an idle state to the coordinates of all the destinations and time for the robot currently in an idle state, coordinates of a target destination nearest to the current coordinates; and a first controlling module 14, configured to control the robot currently in an idle state to move out of the working area according to a backflow path corresponding to the coordinates of the target destination, so as to ensure that the robot currently in an idle state departs orderly.

Compared with the prior art in which the problem of ordered departure of the robot cluster of a large quantity and a high density after activities in the place are over has not been effectively solved, the apparatus for working-place backflow of robots provided in the example of the present invention calculates coordinates of the target destination according to the distances from the current coordinates of the real-time positioned robot in an idle state to coordinates of all destinations and time for the robot in an idle state, and controls the robot to move out of the working area according to the backflow path corresponding to the calculated coordinates of the target destination, ensuring that the robot orderly moves out of the working area place as soon as possible after delivering the goods, effectively reducing the quantity of the idle robots in the place, meanwhile also reducing the possibility of intersection of the paths for the robots, and improving the working efficiency of the robots in the place.

Figure 10:
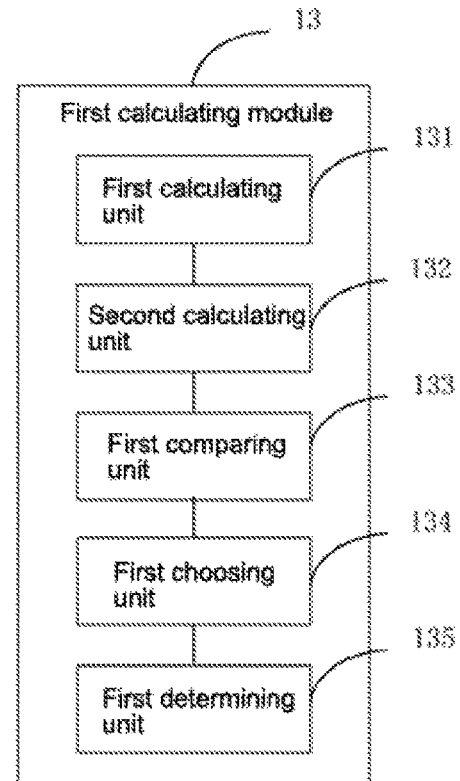
FIG. 10 shows a structural schematic diagram of a first calculating module in an apparatus for working-place backflow of robots provided in an example of the present invention.

A plurality of storage areas are located outside of the working area, with the plurality of storage areas at different zones, and the coordinates of the plurality of destinations are all set in the storage areas of the predetermined zones outside the working area. In order to further ensure that the robot orderly moves out of the working area place as soon as possible after delivering the goods, the storage area of the coordinates of the target destination nearest to the robot in an idle state can be calculated according to the current coordinates of the robot in an idle state, and then the robot in an idle state is controlled to move out of the working area along the backflow path of the storage area of the coordinates of target destination, such that the robot can be enabled to depart more quickly. In this regard, referring to FIG. 10, the first calculating module 13 comprises:

a first calculating unit 131, configured to calculate the backflow path from the current coordinates of the robot currently in an idle state to coordinates of each of the destinations;

a second calculating unit 132, configured to calculate, according to the distances and time corresponding to the backflow paths, a first matching cost between the current coordinates of the robot currently in an idle state and the coordinates of each of the destinations;

a first comparing unit 133, configured to compare a plurality of first matching costs calculated;

a first choosing unit 134, configured to choose smallest one from the plurality of the first matching costs obtained by comparison of the first comparing unit; and a first determining unit 135, configured to determine coordinates of a destination in the backflow path corresponding to the chosen smallest first matching cost as the coordinates of the target destinations nearest to the current coordinates.

Figure 11:
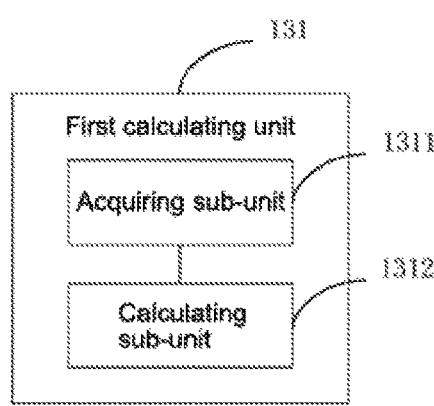
FIG. 11 shows a structural schematic diagram of a first calculating unit in an apparatus for working-place backflow of robots provided in an example of the present invention.

Preferably, a manner of determining this backflow path is specifically realized through the following apparatus, referring to FIG. 11, further, the first calculating unit 131 comprises:

an acquiring sub-unit 1311, configured to acquire current coordinates of other robots; and a calculating sub-unit 1312, configured to calculate, according to the current coordinates of the robot currently in an idle state and the current coordinates of the other robots, the backflow paths from the current coordinates of the robot to the coordinates of each of the destinations.

Figure 12:
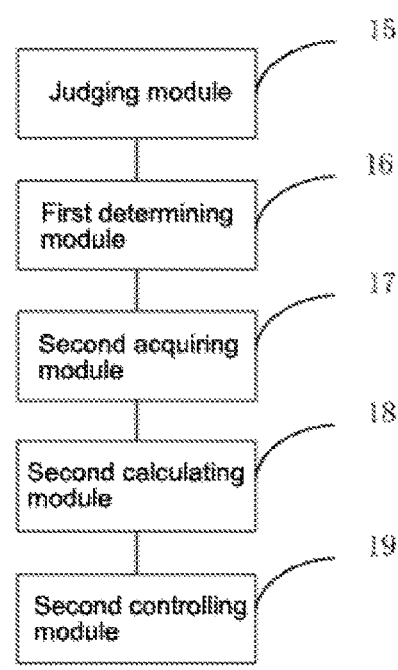
FIG. 12 shows a structural schematic diagram of another apparatus for working-place backflow of robots provided in an example of the present invention.

Considering the problem that the robot in an idle state may have low electric quantity, which causes that the robot may not able to complete the next process from picking up the goods, delivery to returning, or considering the problem that the electric quantity of the robot in an idle state is insufficient to complete the farthest backflow path from the goods delivery point in the whole working area to the point of picking up the goods outside the working area, the electric quantity condition of the robot still should also be detected in real time, and the robot, which is in the case of low electric quantity, is controlled to go to a robot charging station outside the working area for charging. Referring to FIG. 12, specific implementation is as follows: the apparatus further comprises:

a judging module 15, configured to judge whether the electric quantity of the robot currently in an idle state reaches standard electric quantity;

a first determining module 16, configured to determine, when the electric quantity of the robot currently in an idle state is detected to be lower than the standard electric quantity, the corresponding robot as a to-be-charged robot;

a second acquiring module 17, configured to acquire coordinates of all charging stations which the to-be-charged robot is going to return to, wherein coordinates of the charging stations comprise coordinates of a plurality of the charging stations and the coordinates of the plurality of charging stations are all located in the predetermined zones outside the working area;

a second calculating module 18, configured to calculate, according to the distances from the current coordinates of the to-be-charged robot to coordinates of all the charging stations and time for the to-be-charged robot, coordinates of a target charging station nearest to the current coordinates of the to-be-charged robot; and a second controlling module 19, configured to control the to-be-charged robot to move out of the working area according to the backflow path corresponding to the coordinates of the target charging station, so as to ensure that the to-be-charged robot orderly moves into the target charging station for charging.

Figure 13:
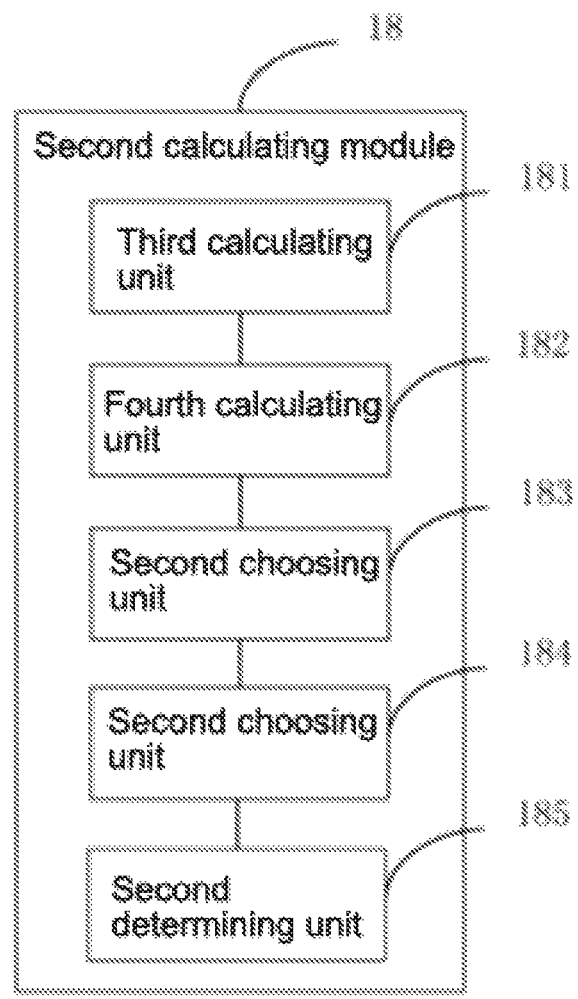
FIG. 13 shows a structural schematic diagram of a second calculating module in an apparatus for working-place backflow of robots provided in an example of the present invention.

A plurality of robot charging stations (including the charging station coordinates) are located outside of the working area, with the plurality of storage areas at different zones, and the coordinates of the plurality of charging stations are all set in the storage areas at the predetermined zones. In order to further ensure that the robot orderly leaves, after delivering the goods, the working area place as soon as possible to go to the robot charging station, coordinates of the target charging station nearest to this robot in an idle state can be calculated according to the current coordinates of this robot in an idle state, and then this robot in an idle state is controlled to move out of the working area along the backflow path of the coordinates of the target charging station, such that the robot can be enabled to depart more quickly. In this regard, referring to FIG. 13, the second calculating module 18 comprises: a third calculating unit 181, configured to calculate the backflow path from the current coordinates of the to-be-charged robot to coordinates of each of the charging stations;

a fourth calculating unit 182, configured to calculate, according to the distances and time corresponding to the backflow paths, a second matching cost between the current coordinates of the to-be-charged robot and the coordinates of each of the charging stations;

a second comparing unit 183, configured to compare a plurality of second matching costs calculated;

a second choosing unit 184, configured to choose smallest one from the plurality of the second matching costs obtained by comparison of the second comparing unit; and a second determining unit 185, configured to determine coordinates of the charging station in the backflow path corresponding to the chosen smallest second matching cost as the coordinates of the target charge station nearest to the current coordinates of the to-be-charged robot.

Figure 14:
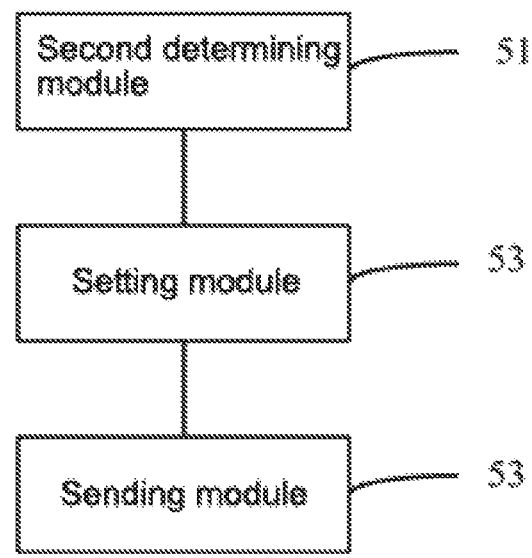
FIG. 14 shows a structural schematic diagram of another apparatus for working-place backflow of robots provided in an example of the present invention.

Further, referring to FIG. 14, when intersection of the paths of the robots occur, the robots are subjected to queuing management, and the above apparatus respectively establishes data connections with a plurality of robots, and further comprises:

a second determining module 51, configured to determine a crowding point zone;

a setting module 52, configured to set, according to pass requests sent by individual robots in the crowding point zone, scheduling commands respectively for the individual robots in the crowding point zone; and a sending module 53, configured to send the scheduling commands respectively to the individual robots in the crowding point zone, so that the robots having received the scheduling commands pass through the crowding point zone according to the scheduling commands.

In the above, the second determining module 51 comprises:

an acquiring unit, configured to acquire the paths of the plurality of robots;

a crowding point determining unit, configured to determine a crowding point according to the paths of the plurality of robots; and a crowding point zone determining unit, configured to determine the crowding point zone from zones adjacent to the crowding point.

In the above, the pass request includes: a position of the robot in the crowding point zone.

In the above, the setting module 52 is configured to set, according to the time sequence of the pass requests sent by individual robots in the crowding point zone and positions of the individual robots in the crowding point zone included in the pass requests, the scheduling commands respectively for the individual robots in the crowding point zone.

In the above, the scheduling command includes: the time when the robot starts to operate in the crowding point zone, a path for the robot passing through the crowding point zone and a speed for the robot passing through the crowding point zone.

In the apparatus provided in the example of the present invention, further, the crowding point zone is determined; the scheduling commands are set respectively for the individual robots in the crowding point zone according to the pass requests sent by individual robots in the crowding point zone and the paths of individual robots in the crowding point zone; the scheduling commands are sent respectively to the individual robots in the crowding point zone, so as to make the robots having received the scheduling commands pass through the crowding point zone according to the scheduling commands. The pass request of each robot in the crowding point zone is analyzed, and the respective scheduling command is set for each robot, avoiding occurrence of crowding of the robots in the crowding point zone, increasing the speeds for the robots passing through the crowding point, and further improving the overall working efficiency of the robot cluster.

Compared with the prior art in which the problem of ordered departure of the robot cluster of a large quantity and a high density after activities in the place are over has not been effectively solved, the apparatus for working-place backflow of robot provided in the example of the present invention calculates coordinates of the target destination coordinates according to the distances from the current coordinates of the real-time positioned robot in an idle state to coordinates of all destinations and time for the robot, and controls the robot to move out of the working area according to the backflow path corresponding to the calculated coordinates of the target destination, ensuring that the robot orderly moves out of the working area place as soon as possible after delivering the goods, effectively reducing the quantity of the idle robots in the place, meanwhile also reducing the possibility of intersection of the paths of the robots, and improving the working efficiency of the robot in the place; moreover, when intersection of the robot paths occurs, the robots are subjected to queuing management, and the crowding point zone is determined by respectively establishing data connections with a plurality of robots; the scheduling commands are respectively set for individual robots in the crowding point zone according to the pass requests sent by the individual robots in the crowding point zone and the paths of the individual robots in the crowding point zone; the scheduling commands are sent respectively to the individual robots in the crowding point zone, so as to make the robots having received the scheduling commands pass through the crowding point zone according to the scheduling commands, avoiding occurrence of crowding of the robots in the crowding point zone, increasing the speeds for the robots passing through the crowding point, and improving the working efficiency of the robots in the place and the overall working efficiency of the robot cluster.

A computer program product for performing the method for working-place backflow of robots provided in the examples of the present invention comprises a computer readable storage medium configured for storing program codes, wherein a command included in the program code can be used to perform the method described in the previous method examples, reference can be made to the method examples for the specific implementation, and unnecessary details will not be given herein.

The person skilled in the art can clearly know that for making description convenient and concise, reference can be made to the corresponding processes in the previous method examples for the specific working processes of the above described systems, apparatuses and units, and unnecessary details will not be given herein.

In the several examples provided in the present application, it should be understood that the disclosed system, apparatus and method can be realized in other manners. The apparatus examples described above are merely illustrative, for example, the dividing of the units is merely a kind of logic function division, and other dividing modes can be used in practical implementation, and for another example, a plurality of units or components can be combined or integrated into another system, or some features can be omitted, or not implemented. Another point is that the displayed or discussed mutual coupling or direct coupling or communication connection can be realized through some communication interfaces, and indirect coupling or communication connection of the apparatus or units may be electrical, mechanical or in other forms.

The units explained as separate parts may be physically separated or not, the parts displayed as units may be a physical unit or not, i.e. may be located in one place, or also may be distributed onto a plurality of network units. Part or all of the units may be chosen according to practical requirements to realize the objects of the solution of the present example.

In addition, various functional units in respective examples of the present invention may be integrated in one processing unit, various units also may independently and physically exist, and two or more units also may be integrated in one unit.

If the function is realized in a form of software functional unit and is sold or used as an individual product, it may be stored in one computer readable storage medium. Based on such understanding, the technical solution of the present invention essentially or the part making contribution to the prior art or part of this technical solution may be embodied in a form of software product, and this computer software product is stored in one storage medium, including several commands used to make one computer device (which may be a personal computer, a sever, or a network device etc.) execute all or part of the steps of the methods of various examples of the present invention. The aforementioned storage medium includes various media capable of storing program codes, such as U disk, mobile hard disk, Read-Only Memory (ROM), Random Access Memory (RAM), diskette or compact disk and so on.

The above are merely specific embodiments of the present invention, however, the protection scope of the present invention is not limited thereto. Any changes or replacements that can be easily considered by any skilled person familiar with the present technical field should be covered within the protection scope of the present invention. Therefore, the protection scope of the present invention should be based on the protection scope of the claims.

The invention claimed is:

1. A method for working-place backflow of robots, comprising:
    acquiring current coordinates of a robot in a working area with the robot currently in an idle state;
    acquiring coordinates of all destinations which the robot currently in an idle state is going to return to, wherein the coordinates of the destinations are plural, with the plural coordinates of the destinations all located outside of the working area; a plurality of storage areas are located outside of the working area, with plurality of storage areas at different zones, and the plurality of coordinates of destinations are all set in the storage areas at predetermined zones outside the working area;
    calculating, according to distances from the current coordinates of the robot currently in an idle state to the coordinates of all the destinations and time for the robot moving from a current location to all the destinations, coordinates of a target destination nearest to the current coordinates; and
    controlling the robot currently in an idle state to move out of the working area according to a backflow path corresponding to the coordinates of the target destination, so as to ensure that the robot currently in an idle state departs orderly,
    wherein the step of calculating, according to distances from the current coordinates of the robot currently in an idle state to the coordinates of all the destinations and time for the robot moving from a current location to all the destinations, coordinates of a target destination nearest to the current coordinates comprises:
    calculating a backflow path from the current coordinates of the robot currently in an idle state to coordinates of each of the destinations;
    calculating, according to distances and time corresponding to the backflow paths, a first matching cost between the current coordinates of the robot currently in an idle state and the coordinates of each of the destinations;

comparing a plurality of the first matching costs calculated, and choosing smallest one from the plurality of the first matching costs; and determining coordinates of a destination in the backflow path corresponding to the chosen smallest first matching cost as the coordinates of the target destination nearest to the current coordinates.

2. The method according to claim 1, wherein the step of calculating a backflow path from the current coordinates of the robot currently in an idle state to coordinates of each of the destinations comprises:

acquiring current coordinates of other robots; and calculating, according to the current coordinates of the robot currently in an idle state and the current coordinates of the other robots, the backflow path from the current coordinates of the robot currently in an idle state to the coordinates of each of the destinations.

3. The method according to claim 1, wherein the method further comprises:

judging whether electric quantity of the robot currently in an idle state reaches standard electric quantity;

determining, when the electric quantity of the robot currently in an idle state is detected to be lower than the standard electric quantity, the corresponding robot currently in an idle state as a to-be-charged robot;

acquiring coordinates of all charging stations which the to-be-charged robot is going to return to, wherein coordinates of the charging stations comprise coordinates of a plurality of the charging stations and the coordinates of the plurality of the charging stations are all located in predetermined zones outside the working area;

calculating, according to distances from the current coordinates of the to-be-charged robot to coordinates of all the charging stations and time for the to-be-charged robot, coordinates of a target charging station nearest to the current coordinates of the to-be-charged robot; and controlling the to-be-charged robot to move out of the working area according to a backflow path corresponding to the coordinates of the target charging station, so as to ensure that the to-be-charged robot orderly moves into the target charging station for charging.

4. The method according to claim 3, wherein the calculating, according to distances from the current coordinates of the to-be-charged robot to coordinates of all the charging stations and time for the to-be-charged robot, coordinates of a target charging station nearest to the current coordinates of the to-be-charged robot comprises:

calculating a backflow path from the current coordinates of the to-be-charged robot to coordinates of each of the charging stations;

calculating, according to distances and the time corresponding to the backflow paths, a second matching cost between the current coordinates of the to-be-charged robot and the coordinates of each of the charging stations;

comparing a plurality of the calculated second matching costs, and choosing smallest one from the second matching costs; and determining coordinates of a charging station in the backflow path corresponding to the chosen smallest second matching cost as the coordinates of the target destination nearest to the current coordinates of the to-be-charged robot.

5. The method according to claim 1, wherein data connections with a plurality of robots are respectively established, and the method further comprises:

determining a crowding point zone;

setting, according to pass requests sent by individual robots in the crowding point zone, scheduling commands for the individual robots in the crowding point zone; and sending the scheduling commands respectively to the individual robots in the crowding point zone, so that robots having received the scheduling commands pass through the crowding point zone according to the scheduling commands.

6. The method according to claim 5, wherein the step of determining a crowding point zone comprises:

acquiring paths of the plurality of robots;

determining a crowding point according to the paths of the plurality of robots; and determining the crowding point zone from zones adjacent to the crowding point.

7. The method according to claim 5, wherein the pass request comprises: a position of the robot in the crowding point zone.

8. The method according to claim 7, wherein the step of setting according to pass requests sent by individual robots in the crowding point zone scheduling commands for individual robots in the crowding point zone comprises:

setting, according to time sequence of the pass requests sent by individual robots in the crowding point zone and positions of the individual robots in the crowding point zone included in the pass requests, the scheduling commands respectively for the individual robots in the crowding point zone.

9. The method according to claim 5, wherein the scheduling command comprises: time when a robot starts to operate in the crowding point zone, a path for the robot passing through the crowding point zone and a speed for the robot passing through the crowding point zone.

10. An apparatus for working-place backflow of robots, comprising:

a first acquiring module, configured to acquire current coordinates of a robot currently in an idle state in a working area;

a second acquiring module, configured to acquire coordinates of all destinations which the robot currently in an idle state is going to return to, wherein the coordinates of the destinations comprise a plurality of destinations and the coordinates of the plurality of the destinations are all located at outside of the working area; a plurality of storage areas are located outside of the working area, with the plurality of storage areas at different zones, and the coordinates of the plurality of the destinations are all set in the storage areas at predetermined zones outside the working area;

a first calculating module, configured to calculate, according to distances from the current coordinates of the robot currently in an idle state to the coordinates of all the destinations and time for the robot currently in an idle state, coordinates of a target destination nearest to the current coordinates; and a first controlling module, configured to control the robot currently in an idle state to move out of the working area according to a backflow path corresponding to the coordinates of the target destination, so as to ensure that the robot currently in an idle state departs orderly, wherein the first calculating module comprises:

a first calculating unit, configured to calculate a backflow path from the current coordinates of the robot currently in an idle state to coordinates of each of the destinations;

a second calculating unit, configured to calculate, according to distances and the time corresponding to the backflow paths, a first matching cost between the current coordinates of the robot currently in an idle state and the coordinates of each of the destinations;

a first comparing unit, configured to compare a plurality of the calculated first matching costs;

a first choosing unit, configured to choose smallest one from the first matching costs obtained by comparison of the first comparing unit; and a first determining unit, configured to determine coordinates of a destination in the backflow path corresponding to the chosen smallest first matching cost as the coordinates of the target destination nearest to the current coordinates.

11. The apparatus according to claim 10, wherein the first calculating unit comprises:

an acquiring sub-unit, configured to acquire current coordinates of other robots; and a calculating sub-unit, configured to calculate, according to the current coordinates of the robot currently in an idle state and the current coordinates of the other robots, the backflow path from the current coordinates of the robot currently in an idle state to the coordinates of each of the destinations.

12. The apparatus according to claim 10, wherein the apparatus further comprises:

a judging module, configured to judge whether electric quantity of the robot currently in an idle state reaches standard electric quantity;

a first determining module, configured to determine, when the electric quantity of the robot currently in an idle state is detected to be lower than the standard electric quantity, the corresponding robot as a to-be-charged robot;

a second acquiring module, configured to acquire coordinates of all charging stations which the to-be-charged robot is going to return to, wherein coordinates of the charging stations comprise coordinates of a plurality of the charging stations and the coordinates of the plurality of the charging stations are all located in predetermined zones outside the working area;

a second calculating module, configured to calculate, according to distances from the current coordinates of the to-be-charged robot to the coordinates of all the charging stations and time for the to-be-charged robot, coordinates of a target charging station nearest to the current coordinates of the to-be-charged robot; and a second controlling module, configured to control the to-be-charged robot to move out of the working area according to a backflow path corresponding to the coordinates of the target charging station, so as to ensure that the to-be-charged robot orderly moves into the target charging station for charging.

13. The apparatus according to claim 12, wherein the second calculating module comprises:

a third calculating unit, configured to calculate the backflow path from the current coordinates of the to-be-charged robot to the coordinates of each of the charging stations;

a fourth calculating unit, configured to calculate, according to distances and time corresponding to the backflow paths, a second matching cost between the current coordinates of the to-be-charged robot and the coordinates of each of the charging stations;

a second comparing unit, configured to compare a plurality of the calculated second matching costs;

a second choosing unit, configured to choose smallest one from the second matching costs obtained by comparison of the second comparing unit; and a second determining unit, configured to determine coordinates of a charging station in the backflow path corresponding to the chosen smallest second matching cost as the coordinates of the target charge station nearest to the current coordinates of the to-be-charged robot.

14. The apparatus according to claim 10, wherein the apparatus respectively establishes data connections with a plurality of robots, and further comprises:

a second determining module, configured to determine a crowding point zone;

a setting module, configured to set, according to pass requests sent by individual robots in the crowding point zone, scheduling commands respectively for the individual robots in the crowding point zone; and a sending module, configured to send the scheduling commands respectively to the individual robots in the crowding point zone, so that robots having received the scheduling commands pass through the crowding point zone according to the scheduling commands.

15. The apparatus according to claim 14, wherein the second determining module comprises:

an acquiring unit, configured to acquire paths of the plurality of robots;

a crowding point determining unit, configured to determine a crowding point according to the paths of the plurality of robots; and a crowding point zone determining unit, configured to determine the crowding point zone from zones adjacent to the crowding point.

16. The apparatus according to claim 14, wherein the pass request comprises: a position of the robot in the crowding point zone.

17. The apparatus according to claim 16, wherein the setting module is configured to set, according to time sequence of the pass requests sent by the individual robots in the crowding point zone and positions of the individual robots in the crowding point zone included in the pass requests, the scheduling commands respectively for the individual robots in the crowding point zone.

18. The apparatus according to claim 14, wherein the scheduling command comprises: time when a robot starts to operate in the crowding point zone, a path for the robot passing through the crowding point zone and a speed for the robot passing through the crowding point zone.

* * * * *